US012617436B2

(12) United States Patent
Ouyang et al.

(10) Patent No.: US 12,617,436 B2
(45) Date of Patent: May 5, 2026

(54) TRAJECTORY PREDICTION FROM MULTI-SENSOR FUSION

(71) Applicant: Waymo LLC, Mountain View, CA (US)

(72) Inventors: Yu Ouyang, Menlo Park, CA (US);
Daniel Ho, Santa Clara, CA (US);
Alper Ayvaci, San Jose, CA (US);
Tencia Lee, San Francisco, CA (US);
Bayram Safa Cicek, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 96 days.

(21) Appl. No.: 18/517,750

(22) Filed: Nov. 22, 2023

(65) Prior Publication Data

US 2025/0162618 A1 May 22, 2025

(51) Int. Cl.
*B60W 60/00* (2020.01)
*B60W 50/00* (2006.01)

(52) U.S. Cl.
CPC .... *B60W 60/0027* (2020.02); *B60W 50/0097* (2013.01); *B60W 2420/403* (2013.01); *B60W 2420/408* (2024.01); *B60W 2554/404* (2020.02); *B60W 2556/35* (2020.02)

(58) Field of Classification Search
CPC ......... B60W 60/0027; B60W 50/0097; B60W 2420/403; B60W 2420/408; B60W 2554/404; B60W 2556/35
See application file for complete search history.

(56) References Cited

U.S. PATENT DOCUMENTS

| | | | | |
|---|---|---|---|---|
| 12,067,471 B2 * | 8/2024 | Gao | ...................... | G08G 1/0104 |
| 12,325,452 B1 * | 6/2025 | Sapp | ...................... | B60W 40/04 |
| 2020/0050207 A1 * | 2/2020 | Huber | ...................... | G06N 3/08 |
| 2021/0114617 A1 * | 4/2021 | Phillips | .............. | G01C 21/3453 |
| 2021/0341920 A1 * | 11/2021 | Singh | ...................... | G06N 3/088 |
| 2024/0246574 A1 * | 7/2024 | Abdulhamid | ..... | B60W 60/0027 |

FOREIGN PATENT DOCUMENTS

| | | | | | |
|---|---|---|---|---|---|
| GB | 202312408 | * | 9/2023 | ............ | B60W 30/09 |
| GB | 2632656 A | * | 2/2025 | ............ | B60W 30/09 |

OTHER PUBLICATIONS

Wikipedia: Circular buffer. Downloaded from Wayback machine Jun. 6, 2023 saved version. (Year: 2023).*

(Continued)

*Primary Examiner* — Kito R Robinson
*Assistant Examiner* — Tanya C Sienko
(74) *Attorney, Agent, or Firm* — Lowenstein Sandler LLP

(57) ABSTRACT

Methods and systems for predicting a trajectory an autonomous vehicle (AV) are disclosed. A method includes generating, based on sensor data from a sensing system of the AV, one or more embeddings, generating, using a machine learning model (MLM) and the one or more embeddings, one or more predicted future trajectories for the AV, and causing, using the one or more predicted future trajectories, a planning system of the AV to generate an update to a current trajectory of the AV.

20 Claims, 10 Drawing Sheets

(56) References Cited

OTHER PUBLICATIONS

"Prediction Based Trajectory Planning for Safe Interactions Between Autonomous Vehicles and Moving Pedestrians in Shared Spaces" by B. Yang et al., IEEE Transactions of Intelligent Transportation Systems, vol. 24, No. 10, Oct. 2023. (Year: 2023).*

"Back to the Future: Planning-Aware Trajectory Forecasting for Autonomous Driving" by B. Ivanovic, article on Stanford A.I. Laboratory blog https://ai.stanford.edu/blog/trajectory-forecasting/ Jun. 25, 2020 (Year: 2020).*

Wikipedia: Generative adversarial network. Downloaded from Wayback machine May 22, 2023 saved version. (Year: 2023).*

"Textual Explanations for Self-Driving Vehicles", by J. Kim et al; Conference Paper ComputerVision—ECCV2018 pp. 577-593 (Year: 2018).*

"A Survey on Trajectory-Prediction Methods for Autonomous Driving" by Y. Huang et al., IEEE Transactions on Intelligent Vehicles vol. 7 No. 3 Sep. 2022 pp. 652-674 (Year: 2022).*

* cited by examiner

Generating, based on sensor data from a sensing system of
an AV, one or more embeddings
310

Generating, using a MLM and the one or more embeddings,
a predicted future trajectory of the AV
320

Causing, using the predicted future trajectory, a planning
system of the AV to generate an update to a current
trajectory of the AV
330

Embedding 200-n

Embedding 200-2

Embedding 200-1

AV Trajectory MLM
128

Predicted Future
Trajectory
402

Generating, based on sensor data from a sensing system of an AV, one or more embeddings
610

Generating, using a MLM and the one or more embeddings, a probability distribution
620

Causing, using the probability distribution, a planning system of the AV to generate an update to a current trajectory of the AV
630

TRAJECTORY PREDICTION FROM MULTI-SENSOR FUSION

TECHNICAL FIELD

The instant specification generally relates to autonomous vehicles. More specifically, the instant specification relates to trajectory prediction from multi-sensor fusion.

BACKGROUND

Autonomous vehicles (AVs), whether fully autonomous or partially self-driving, often operate by sensing an outside environment with various sensors (e.g., radar, optical, audio, humidity, etc.). This outside environment may include other objects in the environment, some of which are mobile. Such objects can include other vehicles, cyclists, pedestrians, animals, etc. AVs should avoid colliding with these mobile objects, and avoiding such collisions often involves predicting a path an object may take. AVs can use machine learning (ML) models to predict these paths, which allows the AVs to select a safe and efficient driving path and trajectory for the AV by avoiding the predicted paths of the other objects.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 2A depicts a top-down view illustrating an example driving environment, in accordance with some implementations of the present disclosure.

FIG. 5A depicts a top-down view illustrating an example driving environment with a coordinate set, in accordance with some implementations of the present disclosure.

FIG. 5B depicts a top-down view illustrating an example driving environment with a polyline, in accordance with some implementations of the present disclosure.

SUMMARY

Figure 1:
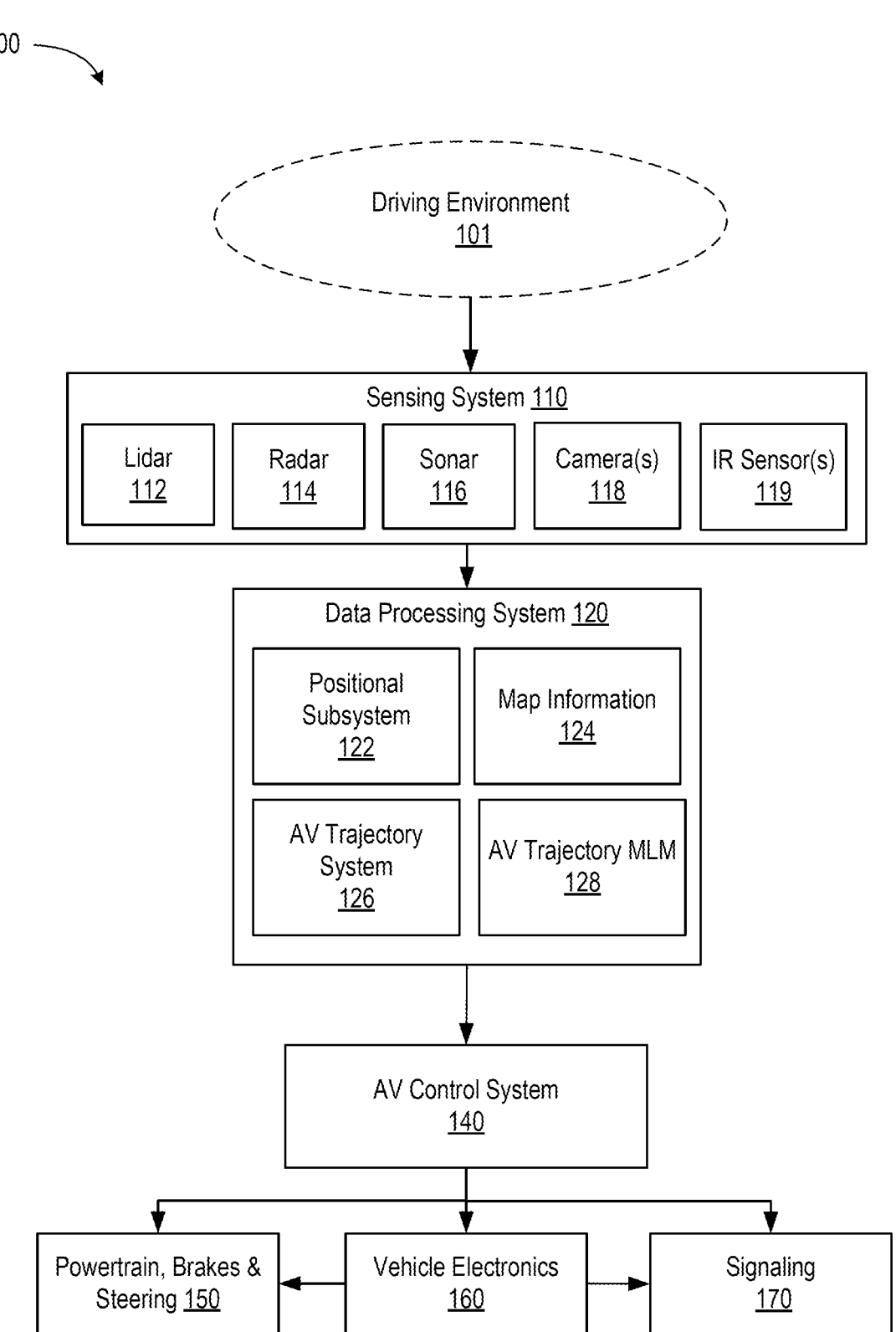
FIG. 1 depicts a block diagram of an example autonomous vehicle (AV) capable of utilizing trajectory prediction from multi-sensor fusion, in accordance with some implementations of the present disclosure.

In one implementation, disclosed is a method for trajectory prediction from multi-sensor fusion. The method includes generating, based on sensor data from a sensing system of an autonomous vehicle (AV), one or more embeddings characterizing an environment around the AV. The method includes generating, by a machine learning model (MLM) and using the one or more embeddings, a predicted future trajectory of the AV. The method includes causing, using the predicted future trajectory, a planning system of the AV to generate an update to a current trajectory of the AV.

In another implementation, disclosed is a system for trajectory prediction from multi-sensor fusion. The system includes a memory and one or more processing devices coupled to the memory and configured to perform operations. The operations include generating multiple of embeddings based on sensor data from a sensing system of an AV. Each embedding characterizes an environment around the AV. The operations include generating, by an MLM and based on the multiple embeddings, multiple predicted future trajectories of the AV. The operations include providing the multiple predicted future trajectories to a planning system of the AV to generate an update to a current trajectory of the AV.

In another implementation, disclosed is a system for trajectory prediction from multi-sensor fusion. The system includes a memory and one or more processing devices coupled to the memory and configured to perform operations. The operations include generating, based on sensor data from a sensing system of an AV, one or more embeddings characterizing an environment around the AV. The operations include generating, by an MLM and using the one or more embeddings, a probability distribution. The probability distribution includes multiple predicted future trajectories of the AV. The probability distribution includes, for each predicted future trajectory, a probability. The operations include causing, using the probability distribution, a planning system of the AV to generate an update to a current trajectory of the AV.

DETAILED DESCRIPTION

An autonomous vehicle or a vehicle deploying various driving assistance features (AV) should safely and efficiently navigate in an environment around the AV. The environment can include road features (e.g., the geometry of a road, road lanes, curves in a road, etc.), traffic light states (e.g., whether a light indicates that vehicles should move, slow down, or stop), immobile objects (e.g., barriers, construction cones, foreign object debris (FOD), etc.), mobile objects (e.g., other vehicles, pedestrians, cyclists, etc.), or other things that can appear in a driving environment. The AV should plan its own trajectory and positioning to avoid collisions with objects, all while following the rules of the road.

Conventionally, AVs gather information on road features, traffic light states, other objects, and other things in the driving environment using various onboard systems. The AV then inputs this information into specialized pre-processing systems that are each configured to detect certain conditions in the driving environment. Such pre-processing systems can include a traffic state detection system, a navigation system, an object detection system, etc. These systems then output their results, and the AV feeds these results into one or more machine learning models (MLMs), which use these inputs to calculate one or more future operations of the AV. Executing these pre-processing systems and the individual MLMs use a large amount of processing resources of computer devices onboard the AV.

Aspects and implementations of the present disclosure address these and other challenges of existing AV systems. Instead of using computationally intensive pre-processing systems and a multiple MLMs, the present disclosure provides systems and methods that predict future trajectories for the AV and other objects in the driving environment directly from sensor data from a sensing system of the AV. The systems and methods utilize a MLM trained on sensor data to predict trajectories of the AV and other objects simultaneously with object detection, traffic light state determination, drivable surface evaluation, and other AV tasks. In particular, in some embodiments, the sensor data received from multiple sensing device of the sensing system is fused into an embedding compatible with the trained MLM. The embedding is provided as input to the trained MLM, which generates one or more outputs indicating predicted future locations of the AV. The predicted future locations are then used by a planning system of the AV to generate an update to the trajectory of the AV, The advantages of the disclosed techniques and systems include, but are not limited to, reduced use in computational resources by forgoing the use of specialized pre-processing systems and MLMs and, instead, using an MLM that uses sensor data to simultaneously predict trajectories, detect objects, and determine other driving environment conditions. Such reduced use of computational resources can include, but are not limited to reduced processing device usage, memory usage, storage space usage, and other reduction in the use of computational resources. Furthermore, because such pre-processing systems and specialized MLMs are not needed, time and other resources are not used in developing, testing, and maintaining such systems and components.

In those instances where the description of implementations refers to autonomous vehicles, it should be understood that similar techniques can be used in various driver assistance systems that do not rise to the level of fully autonomous driving systems. More specifically, disclosed techniques can be used in Society of Automotive Engineers (SAE) Level 2 driver assistance systems that implement steering, braking, acceleration, lane centering, adaptive cruise control, etc., as well as other driver support. Likewise, the disclosed techniques can be used in SAE Level 3 driving assistance systems capable of autonomous driving under limited (e.g., highway) conditions. In such systems, fast and accurate detection and tracking of mobile objects can be used to inform the driver of the approaching objects, with the driver making the ultimate driving decisions (e.g., in SAE Level 2 systems), or to make certain driving decisions (e.g., in SAE Level 3 systems), such as reducing speed, changing lanes, etc., without requesting driver's feedback.

In those instances where the description of implementations refers to MLMs, it should be understood that an MLM can refer to a variety of MLMs. For example, a MLM can include an artificial neural network (ANN), which can include multiple nodes ("neurons") arranged in one or more layers, and a neuron may be connected to one or more neurons via one or more edges ("synapses"). The synapses may perpetuate a signal from one neuron to another, and a weight, bias, or other configuration of a node or synapse may adjust a value of the signal. The ANN can undergo training to adjust the weights or adjust other features of the ANN. Such training may include inputting trajectory information of one or more objects, and other information, into the ANN and adjusting the ANN's features in response to an output of the ANN. An ANN may include a deep learning ANN, which may include an ANN with a large number of neurons, synapses, or layers. An MLM may include another type of MLM, such as clustering, decision trees, Bayesian networks, or the like.

FIG. 1 is a diagram illustrating components of an example AV 100 capable of trajectory prediction from multi-sensor fusion, in accordance with some implementations of the present disclosure. AVs 100 can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

An environment 101 around the AV 100 (sometimes referred to as the "driving environment") can include any objects (animated or non-animated) located outside the AV 100, such as roadways, buildings, trees, bushes, sidewalks, bridges, mountains, other vehicles, pedestrians, animals, and so on. The driving environment 101 can be urban, suburban, rural, and so on. In some implementations, the driving environment 101 can be an off-road environment (e.g., farming or other agricultural land). In some implementations, the driving environment can be an indoor environment, (e.g., the environment of an industrial plant, a shipping warehouse, a hazardous area of a building, and so on). In some implementations, the driving environment 101 can be substantially flat, with various objects moving parallel to a surface (e.g., parallel to the surface of the Earth). In other implementations, the driving environment 101 can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, the "driving environment" can include any possible flying environment of an aircraft or a marine environment of a naval vessel. The objects of the driving environment 101 can be located at any distance from the AV 100, from close distances of several feet (or less) to several miles (or more).

As described herein, in a semi-autonomous or partially autonomous driving mode, even though the AV 100 assists with one or more driving operations (e.g., steering, braking and/or accelerating to perform lane centering, adaptive cruise control, advanced driver assistance systems (ADAS), or emergency braking), the human driver is expected to be situationally aware of the AV's 100 surroundings and supervise the assisted driving operations. Here, even though the AV 100 may perform all driving tasks in certain situations, the human driver is expected to be responsible for taking control as needed.

Although, for brevity and conciseness, various systems and methods may be described below in conjunction with AVs 100, similar techniques can be used in various driver assistance systems that do not rise to the level of fully autonomous driving systems. In the United States, the SAE have defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

The example AV 100 can include a sensing system 110. The sensing system 110 can include various electromagnetic (e.g., optical) and non-electromagnetic (e.g., acoustic) sensing subsystems and/or devices. A sensing device of the sensing system 110 can include a radar unit 114 (or multiple radar units 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using Doppler shift technology). Hereinafter, "velocity" refers to both how fast the object is moving (the speed of the object) as well as the direction of the object's motion. A sensing device of the sensing system 110 can include a lidar unit 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on the AV 100.

Lidar 112 can include one or more light sources producing and emitting signals and one or more detectors of the signals reflected back from the objects. In some implementations, lidar 112 can perform a 360-degree scan in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

A sensing device of the sensing system 110 can further include one or more cameras 118 configured to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous)

stream of images of the driving environment 101. The sensing system 110 can also include one or more infrared (IR) sensors 119. The sensing system 110 can further include one or more sonars 116, which can be ultrasonic sonars, in some implementations.

The AV 100 can include a data processing system 120. The data processing system 120 may include one or more computers or computing devices. The data processing system 120 may include hardware or software that receives data from the sensing system 110, processes the received data, and determines how the AV 100 should operate in the driving environment 101. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can include a positioning subsystem 122. The positioning subsystem 122 uses positioning data (e.g., global positioning system (GPS) and inertial measurement unit (IMU) data) and the map information 124 to help accurately determine the location of the AV 100.

The data processing system 120 can include an AV trajectory system 126. The AV trajectory system 126 is configured to use the AV trajectory MLM 128 to determine a future trajectory of the AV 100. The AV trajectory system 126 receives information from the sensing system 110, formats the information into an embedding compatible with the AV trajectory MLM 128, and inputs the embedding into the AV trajectory MLM 128 to generate an output usable by the AV control system (AVCS) 140, as discussed herein.

The data processed or generated by the data processing system 120, including the AV trajectory system 128, can be used by the AVCS 140 of the AV 100. The AVCS 140 can include one or more algorithms that plan how the AV 100 is to behave in various driving situations and environments. For example, the AVCS 140 can include a navigation system for determining a global driving route to a destination point. The AVCS 140 can also include a driving path selection system for selecting a particular path through the immediate driving environment 101, which can include selecting a traffic lane, negotiating traffic congestion, choosing a place to make a U-turn, selecting a trajectory for a parking maneuver, and so on. The AVCS 140 can also include an obstacle avoidance system for safe avoidance of various objects or other obstructions (rocks, stalled vehicles, a jaywalking pedestrian, and so on) within the driving environment 101 of the AV 100. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of the AVCS 140 can generate control outputs for use by various systems and components of the AV 100, such as the powertrain, brakes, and steering 150, vehicle electronics 160, signaling 170, and other systems and components not explicitly shown in FIG. 1. These systems and components may modify the operations of the AV 100 based on the control output. The powertrain, brakes, and steering 150 can include an engine (internal combustion engine, electric engine, and so on), transmission, differentials, axles, wheels, steering mechanism, and other systems. The vehicle electronics 160 can include an onboard computer, engine management, ignition, communication systems, carputers, telematics, in-car entertainment systems, and other systems and components. The signaling 170 can include high and low headlights, stopping lights, turning and backing lights, horns and alarms, an inside lighting system, a dashboard notification system, a passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, the AVCS 140 can determine that an obstacle identified by the data processing system 120 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

As used herein, the term "object" or "objects" can include any entity, item, device, body, or article (animate or inanimate) located outside the AV 100, such as other vehicles, cyclists, pedestrians, animals, roadways, buildings, trees, bushes, sidewalks, bridges, mountains, piers, banks, landing strips, or other things.

Figure 2A:
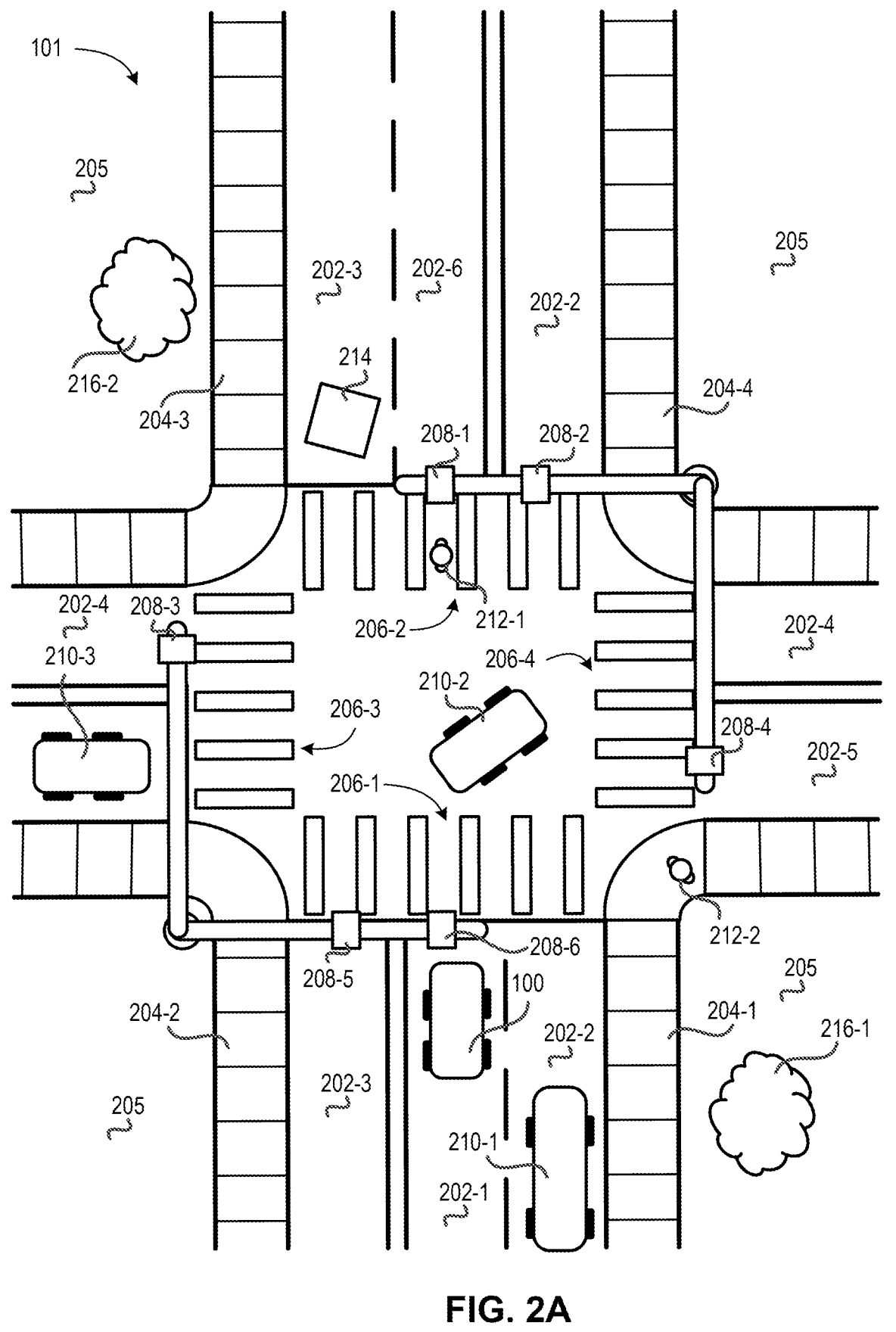

FIG. 2A is a diagram illustrating an example driving environment, in accordance with some implementations of the present disclosure. The driving environment, such as driving environment 101, may include the AV 100. The driving environment 101 may include one or more road lanes 202-1, . . . , 202-6. A road lane 202 may include a portion of a road that a vehicle can drive on. For example, in FIG. 2A, the AV 100 is positioned in the road lane 202-1. Different road lanes 202 may be divided by lane markers. The driving environment 101 may include one or more sidewalks 204-1, . . . , 204-4. The driving environment 101 may include a non-driving surface 205. The non-driving surface 205 may include a location where the AV 100 should not drive. The driving environment 101 may include one or more crosswalks 206-1, . . . , 206-4. The driving environment 101 may include one or more traffic lights 208-1, . . . , 208-6. A traffic light 208 may use colors, arrows, or other indicia to indicate whether the traffic in a certain road lane 202 should move, stop, slow down, turn, or take some other action.

In some implementations, the driving environment 101 may include one or more vehicles 210-1, . . . , 210-3. A vehicle 210 may include a car, a truck, a bus, a motorcycle, etc. The driving environment 101 may include one or more pedestrians 212-1, 212-2. The driving environment 101 may include a foreign object 214. A foreign object 214 may include an object on a drivable surface that should be avoided by the AV 100. The foreign object could include debris, construction cones, or other objects. The driving environment 101 may include other objects, for example, in FIG. 2A, one or more trees 216-1, 216-2.

The driving environment 101 may include one or more drivable surfaces. Such drivable surfaces can include a road lane 202 or a crosswalk 206. A drivable surface can include a driveway, parking lot, or another location where a vehicle may drive. A drivable surface can include a portion of the sidewalk 204, for example, a portion of the sidewalk that connects a road lane 202 to a driveway, parking lot, or other drivable surface. In some implementations, a certain location may change from a drivable surface to a non-drivable surface, and vis versa, under certain conditions. For example, in response to a pedestrian 212 being present in a crosswalk 206, the crosswalk 206 may change from a drivable surface to a non-driving surface. Once the crosswalk is free of pedestrians 212, the crosswalk may change to a drivable surface. However, some non-drivable surfaces, such as the non-driving surface 205 of FIG. 2A, may be a permanent non-drivable surface. Other examples of non-driving surfaces 205 can include a yard, a building, or other locations where a vehicle should not drive.

In some implementations, the sensing system 110 of the AV 100 may generate sensor data. The sensor data may include data generated in response to components of the sensing system 110 sensing the components of the driving environment 101. For example, the sensor data may include one or more camera images taken by a camera 118. The sensor data may include lidar data obtained from the lidar 112 or radar data obtained from the radar 114. The lidar data or radar data may include distances to one or more objects around the AV 100. The AV trajectory system 126 may receive the sensor data and generate an embedding based on the sensor data to be as input for the AV trajectory MLM 128.

Figure 2B:
FIG. 2B depicts an example embedding used by systems and methods for trajectory prediction from multi-sensor fusion, in accordance with some implementations of the present disclosure.

FIG. 2B is a diagram illustrating an example embedding generated by an AV trajectory system for use by an AV trajectory MLM, in accordance with some implementations of the present disclosure. An embedding can refer to any suitable digital representation of an input data, e.g., as a vector of any number of components, which can have integer values or floating-point values. Embeddings can be considered as vectors or points in an N-dimensional embedding space with the dimensionality N of the embedding space (defined as part of the MLM architecture) being smaller than the size of the input data.

Illustrated embedding 200 may include a digital representation of a portion of the driving environment 101. For example, the embedding 200 of FIG. 2B is a digital representation of the driving environment 101 shown in FIG. 2A. The embedding 200, as shown in FIG. 2B, may include a two-dimensional array of numerical values, and each element of the array corresponds to a specific location in the driving environment 101. Each element of the array includes a numerical value that indicates what is located at the corresponding location.

In the embedding 200, the integers contained in the cells correspond to the element numberings of FIG. 2A. For example, the embedding 200 includes four elements that contain the number "100." These elements indicate the location of the AV 100. The elements of the embedding 200 that include the number "202" indicate the locations of a road lane 202. The elements of the embedding 200 that include the number "204" indicate the locations of a sidewalk 204, and so on. The elements that include the number "203" may indicate the locations of lanes of a road lane 202.

In some embodiments, in an embedding 200 element, a numerical value indicating a road lane 202 may indicate a direction of travel for that road lane 202. Thus, elements corresponding to different road lanes 202 may include different values.

In some implementations, a numerical value indicating a vehicle 210, a pedestrian 212, or some other object may indicate an orientation of the vehicle 210, pedestrian 212, or other object. The orientation may include a direction that the object is facing or a direction that a portion of the object is facing. For example, a numerical value may characterize an orientation of a head of a pedestrian 212. The orientation may include a direction the pedestrian's 212 head is facing, an orientation of the pedestrian's 212 relative to the pedestrian's 212 body's front, or some other orientation. A numerical value may characterize an orientation of a driver's head of a vehicle 210. Indications of a pedestrian's 212 or driver's head's orientation may help indicate a future trajectory of the pedestrian 212 or the vehicle 210. Thus, the embedding 200 may not only indicate the presence of something in the driving environment 101 but may also indicate a direction, which may produce more accurate results from the AV trajectory MLM 128.

In one or more implementations, an element that indicates a foreign object 214 may include a value that specifies what the corresponding foreign object 214 is. For example, an element for a construction cone may have a different value than an element that indicates debris. Similarly, an element that indicates a vehicle 210 may include a value that specified what type of vehicle the corresponding vehicle 210 is. Similarly, an element that indicates a pedestrian 212 may include a value specifying the type of pedestrian 212 (e.g., a person walking, a person jogging, a person with a stroller or cart, an animal, etc.).

In some cases, an element of the embedding 200 may include a numerical value that indicates a condition of an object or a portion of an object. For example, a numerical value may correspond to an open door of a vehicle 210 (e.g., of a personal vehicle or a mass transit vehicle), an object extending from the vehicle 210 (e.g., a piece of furniture extending out of a truck bed), or some other condition that can be associated with an object.

As discussed above, certain drivable surfaces may change to a non-drivable surface under certain conditions. An embedding 200 element may include a numerical value that indicates the current status of a location as a drivable or non-drivable surface. For example, an embedding element may include a certain value for an unoccupied crosswalk 206 and a different value for an occupied crosswalk 206.

An embedding 200 element whose numerical value characterizes a traffic light 208 may include a value that characterizes a state of the traffic light 208. For example, as depicted in FIG. 2B, an element may include the numerical value "230," which may correspond to a red light. Another element corresponding to a different traffic light 208 may include the value "232," which may indicate a green light. As depicted in FIG. 2B, an element corresponding to a traffic light 208 may include a value of "234," which may indicate that the AV 100 is unable to determine the status of the traffic light 208 (e.g., because the face of the traffic light is obscured). Other values of an element that corresponds to a traffic light 208 may indicate a yellow light, a red turn arrow, a green turn arrow, or other statuses that a traffic light 208 may have.

In some embodiments, the AV trajectory system 126 may fuse different sensor data from different components of the sensing system 110 to determine the value of an element of the embedding 200. For example, the lidar 112 may determine a distance to a pedestrian 212 and a position of the pedestrian 212, and the camera 118 may obtain a camera image of the pedestrian 212, which may indicate a direction the pedestrian 212 is facing. The AV trajectory system 126 may use the distance, position, and direction of the pedestrian 212 to determine a value for the element of the embedding 200 that corresponds to the pedestrian 212. Similarly, the lidar 112 may determine a distance to a traffic light 208 and its position, and the camera 118 may obtain a camera image of the traffic light 208, which may indicate the color of the light. The AV trajectory system 126 may use the distance, position, and light color to determine a value for the embedding 200 element that corresponds to the traffic light 208. The AV trajectory system 126 may use other data fusion configurations using the different sensor data from the different components of the sensing system 110.

Figure 3:
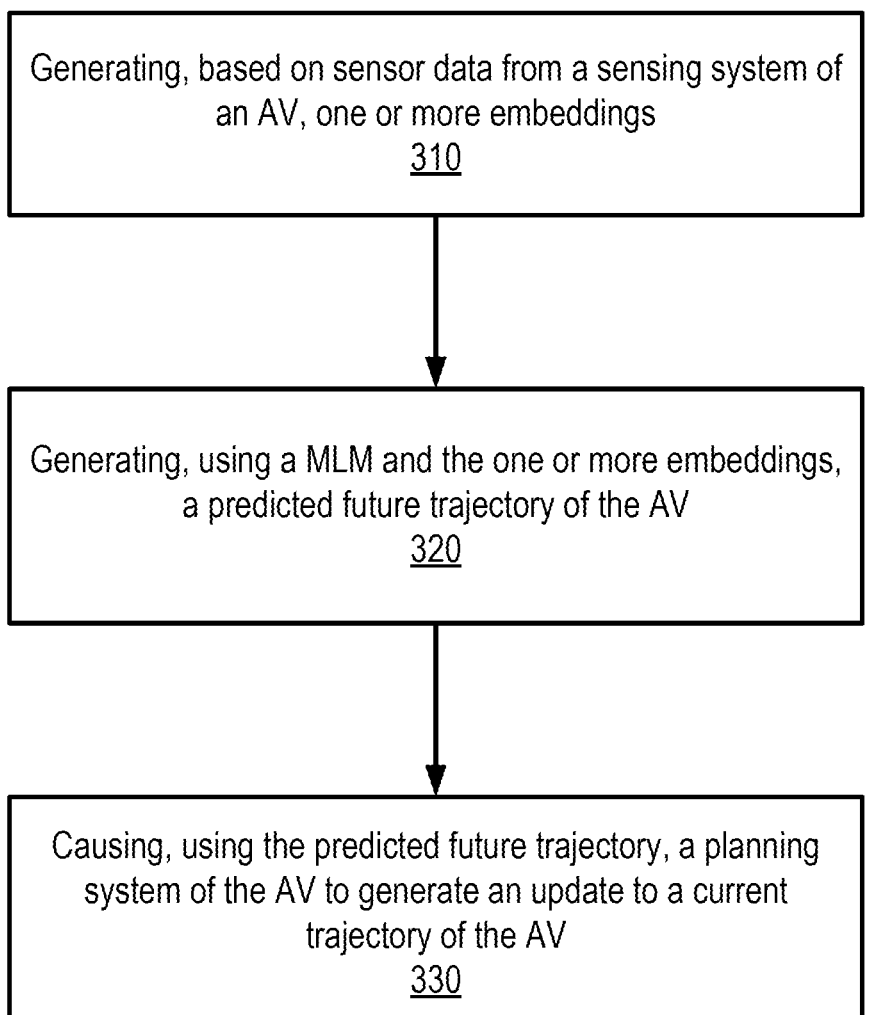
FIG. 3 depicts a flowchart diagram of an example method for trajectory prediction from multi-sensor fusion, in accordance with some implementations of the present disclosure.

FIG. 3 is a flowchart illustrating one embodiment of a method 300 for trajectory prediction from multi-sensor fusion, in accordance with some implementations of the present disclosure. A processing device, having one or more central processing units (CPUs), one or more graphics processing units (GPUs), and/or memory devices communicatively coupled to the CPU(s) and/or GPU(s) can perform the method 300 and/or each of their individual functions, routines, subroutines, or operations. The method 300 can be directed to systems and components of a vehicle. In some implementations, the vehicle can be an autonomous vehicle (AV), such as AV 100 of FIG. 1. In some implementations, the vehicle can be a driver-operated vehicle equipped with driver assistance systems, e.g., Level 2 or Level 3 driver assistance systems, that provide limited assistance with specific vehicle systems (e.g., steering, braking, acceleration, etc. systems) or under limited driving conditions (e.g., highway driving). The method 300 can be used to improve performance of the AVCS 140. In certain implementations, a single processing thread can perform method 300. Alternatively, two or more processing threads can perform method 300, each thread executing one or more individual functions, routines, subroutines, or operations of the methods. In an illustrative example, the processing threads implementing method 300 can be synchronized (e.g., using semaphores, critical sections, and/or other thread synchronization mechanisms). Alternatively, the processing threads implementing method 300 can be executed asynchronously with respect to each other. Various operations of method 300 can be performed in a different (e.g., reversed) order compared with the order shown in FIG. 3. Some operations of method 300 can be performed concurrently with other operations. Some operations can be optional.

At block 310, the method 300 includes generating, based on sensor data from the sensing system 110 of the AV 100, one or more embeddings 200. The one or more embeddings 200 may characterize an environment 101 (e.g., a current driving environment) around the AV 100. The one or more embeddings 200 may be similar to the embedding 200 of FIG. 2. The sensor data may include data from the lidar 112, the radar 114, the sonar 116, the camera 118, or the IR sensor 119 of the sensing system 110.

Generating the one or more embeddings 200 may include determining the values of the elements of an embedding 200, as discussed above. For example, generating an embedding 200 may include determining the value of the element based on what kind of object is present in the location corresponding to the element, a direction the object is facing, a condition of the object, a status of a traffic light 208, etc.

In one implementation, the sensor data may include data from multiple sensor devices of the sensing system 110 of the AV 100. The sensor devices may include at least some of the sensor devices described above, including a lidar unit 112, a radar unit 114, a sonar unit 116, a camera 118, or a IR sensor 119. Generating, based on the sensor data from the sensing system 110 of the AV 100, the one or more embeddings 200 (block 310) may include combining the data from the multiple sensor devices into an embedding 200 of the one or more embeddings. The embedding 200 may include a single embedding 200.

Combining the data from the multiple sensor devices into the embedding 200 may include (1) determining a numerical value that corresponds to at least some of the data from a sensor device; (2) determining a location that corresponds to the at least some of the data from the sensor device; and (3) inserting the numerical value into the element of the embedding 200 that corresponds to the determined location. As an example, the camera 118 may generate data indicating that sidewalk is located at a first location. In response, the data processing system 120 may (1) determine the numerical value "204" corresponds to the data from the camera 118 that indicates a sidewalk, (2) determine the first location where the sensed sidewalk is located, and (3) insert the numerical value "204" into the element of the embedding 200 that corresponds to the first location. In some implementations, as discussed above, the AV trajectory system 126 may fuse different sensor data from different components of the sensing system 110 to determine the value of an element of the embedding 200. Fusing the different sensor data may include inputting the different sensor data into an embedding algorithm to generate the numerical value.

In some embodiments, the one or more embeddings 200 may include multiple embeddings 200. Each embedding 200 may characterize the driving environment 101 around the AV 100 at a different time. During operation of the AV 100, the AV 100 may periodically sense the driving environment 101 using the sensing system 110. Each sensing operation may result in an embedding 200. The AV 100 may sense the driving environment 101 every 100 milliseconds (ms), 200 ms, 250 ms, 500 ms, 1 second, 2 seconds, etc. As an example, a first embedding 200 may include an array of numerical values characterizing the driving environment 101 around the AV 100 at a first time. The first time may include the current time. A second embedding 200 may include an array of numerical values characterizing the driving environment 101 around the AV 100 at a second time. The second time may include a time before the first time. For example, the second time may include 250 ms before the current time.

In some embodiments, the AV 100 may store a predetermined number of embeddings. The predetermined number of embeddings may include a rolling set of embeddings 200. Each time the AV trajectory system 126 generates a new embedding 200 characterizing the current state of the driving environment 101, the AV trajectory system 126 may remove the oldest embedding 200 from the set of embeddings 200. The predetermined number of embeddings 200 in the rolling set may include 1, 2, 3, 4, 5, 6, 7, 8, 9, 10, or more than 10 embeddings 200.

At block 320, the method 300 includes generating, using an MLM and the one or more embeddings 200, one or more predicted future trajectories of the AV. The MLM may include the AV trajectory MLM 128.

The AV trajectory MLM 128 may include a trained MLM. Training the AV trajectory MLM 128 may include training the AV trajectory MLM 128 using a dataset. The dataset may include multiple records. Each record may include one or more example embeddings associated with prior sensor data and a corresponding ground truth. The ground truth may include one or more trajectories or coordinates that correspond to locations of the AV 100.

In some embodiments, each dataset record's one or more embeddings may include an embedding generated from sensor data gathered by an AV (which may include the AV 100, an AV in a fleet of AVs to which the AV 100 belongs, or some other AV) or by some other vehicle (e.g., a vehicle driving by a human). The AV or vehicle may have recorded and stored the sensor data from actual driving scenarios, test driving scenarios, or other driving situations. The ground truth may include a trajectory of the AV that corresponds to the actual outcome of the corresponding driving situation (e.g., the trajectory that the AV or vehicle actually followed in the driving situation). The ground truth may include one or more coordinates indicating actual locations the AV or vehicle drove to during the corresponding driving situation. The one or more trajectories or coordinates of the ground truth may include trajectories or coordinates generated by software or generated by a human.

In some implementations, a dataset record can include sensor data from a sensing system 110 of an AV (which may or may not be the AV 100) in a driving environment around the AV. The record can include a location history of the AV in the driving environment around the AV. The location history may include coordinates or other data that indicate locations where the AV has been in the driving environment. The record can include one or more location histories for one or more objects in the driving environment around the AV. A location history of an object may include coordinates or other data that indicate locations where the object has been in the driving environment. In some cases, the sensor data, location history of the AV, or the one or more location histories of the one or more objects may be in the format of one or more embeddings. The ground truth of the record may include a trajectory of the AV in the environment around the AV. The trajectory may include a set of coordinates indicating predicted future locations of the AV other positional, velocity, acceleration, or directional data of the AV.

In one implementation, the training process may include dividing the dataset into a training dataset and a testing dataset. In some cases, the training process may include dividing the dataset into a training dataset, a validation dataset, and a testing dataset. During the training process of the AV trajectory MLM 128, the training dataset records are input into the AV trajectory MLM 128 to adjust the weights, biases, and other parameters and configurations of the AV trajectory MLM 128 based on whether the AV trajectory MLM 128 successfully predicted the ground truth of the associated record. In some cases, the validation dataset is input into the AV trajectory MLM 128, and certain hyperparameters of the AV trajectory MLM 128 are adjusted based on its output. The hyperparameters can include the number of neurons in a layer, the number of layers, which neurons are connected to each other with synapses, etc. Lastly, the testing dataset is input into the AV trajectory MLM 128 to test the AV trajectory MLM's 128 accuracy and, based on the accuracy, the AV trajectory MLM 128 may undergo further training. In some embodiments, the training process may include an unsupervised training process.

Figure 4A:
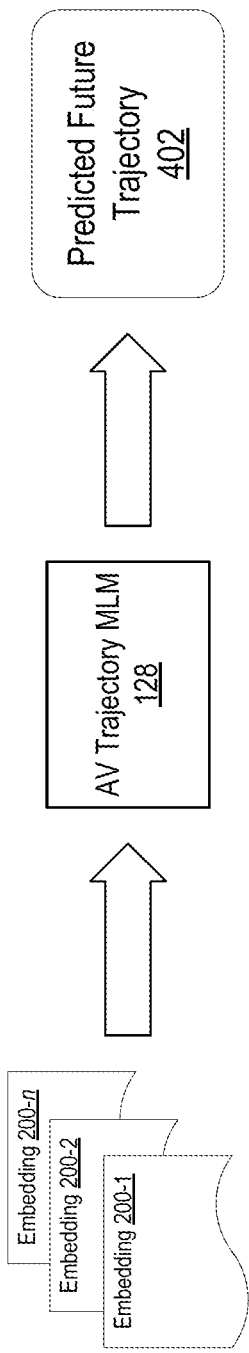
FIG. 4A depicts an example dataflow for trajectory prediction from multi-sensor fusion, in accordance with some implementations of the present disclosure.

Block 320 may include inputting the one or more embeddings 200 of block 310 (embeddings associated with the current environment 101 of the AV) into the AV trajectory MLM 128. In some implementations, as shown in FIG. 4A, inputting the one or more embeddings 200-1, . . . , 200-n may include inputting all of the one or more embeddings 200-1, . . . , 200-n into the AV trajectory MLM 128 as a single piece of input, and the AV trajectory MLM 128 may generate the predicted future trajectory 402 as the output. As discussed above, the one or more embeddings 200-1, . . . , 200-$n$ may include a rolling set of embeddings 200, where an oldest embedding 200-1 is removed in response to a new embedding 200-$n$ causing the set of embeddings to grow beyond n, where n is the predetermined size. In some implementations, the AV trajectory MLM may generate multiple predicted future trajectories 402.

Figure 4B:
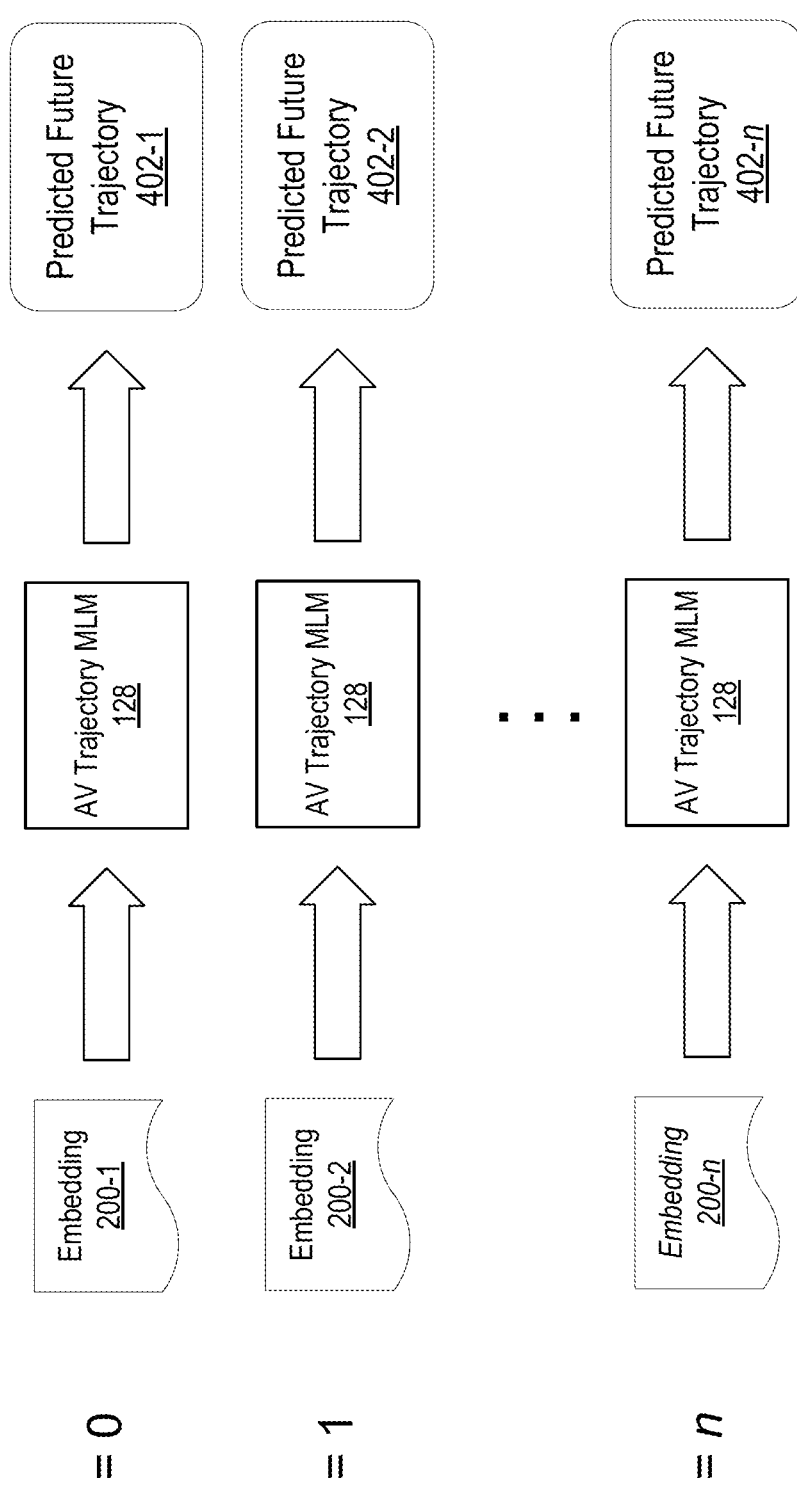
FIG. 4B depicts an example dataflow for trajectory prediction from multi-sensor fusion, in accordance with some implementations of the present disclosure.

In other implementations, as shown in FIG. 4B, inputting the one or more embeddings 200-1, . . . , 200-$n$ may include inputting the different embeddings 200-1, . . . , 200-$n$ one at a time, and the AV trajectory MLM 128 may generate a predicted future trajectory 402 for each embedding 200 that was input. In some implementations, the AV trajectory MLM 128 may include a MLM configured to use internal state to process sequences of inputs. Thus, the AV trajectory MLM 128 may include a recurrent neural network (RNN) (which may include a long short-term memory (LSTM), a reservoir computing MLM, some other type of RNN), a convolutional neural network (CNN), a transformer, or some other type of MLM capable of storing state.

As an example, the AV 100 may be configured to generate sensor data every 250 ms and send the sensor data to the AV trajectory system 126 to generate an embedding 200. The AV trajectory MLM 128 may use a first embedding 200-1 as input and output a first predicted future trajectory 402-1. Later, the AV trajectory MLM 128 may use a second embedding 200-2 as input, the AV trajectory MLM 128 may still retrain some information from processing the first embedding 200-1 as an internal state, and the AV trajectory MLM 128 may output a second predicted future trajectory 402-2. Later, the AV trajectory MLM 128 may use a third embedding 200-3 as input, the AV trajectory MLM 128 may still retain some information from processing the first and second embeddings 200-1, 200-2 as an internal state, and the AV trajectory MLM 128 may output a third predicted future trajectory 402-3. This process may continue every 250 ms with each new embedding 200 to generate another predicted future trajectory 402.

Figure 5A:
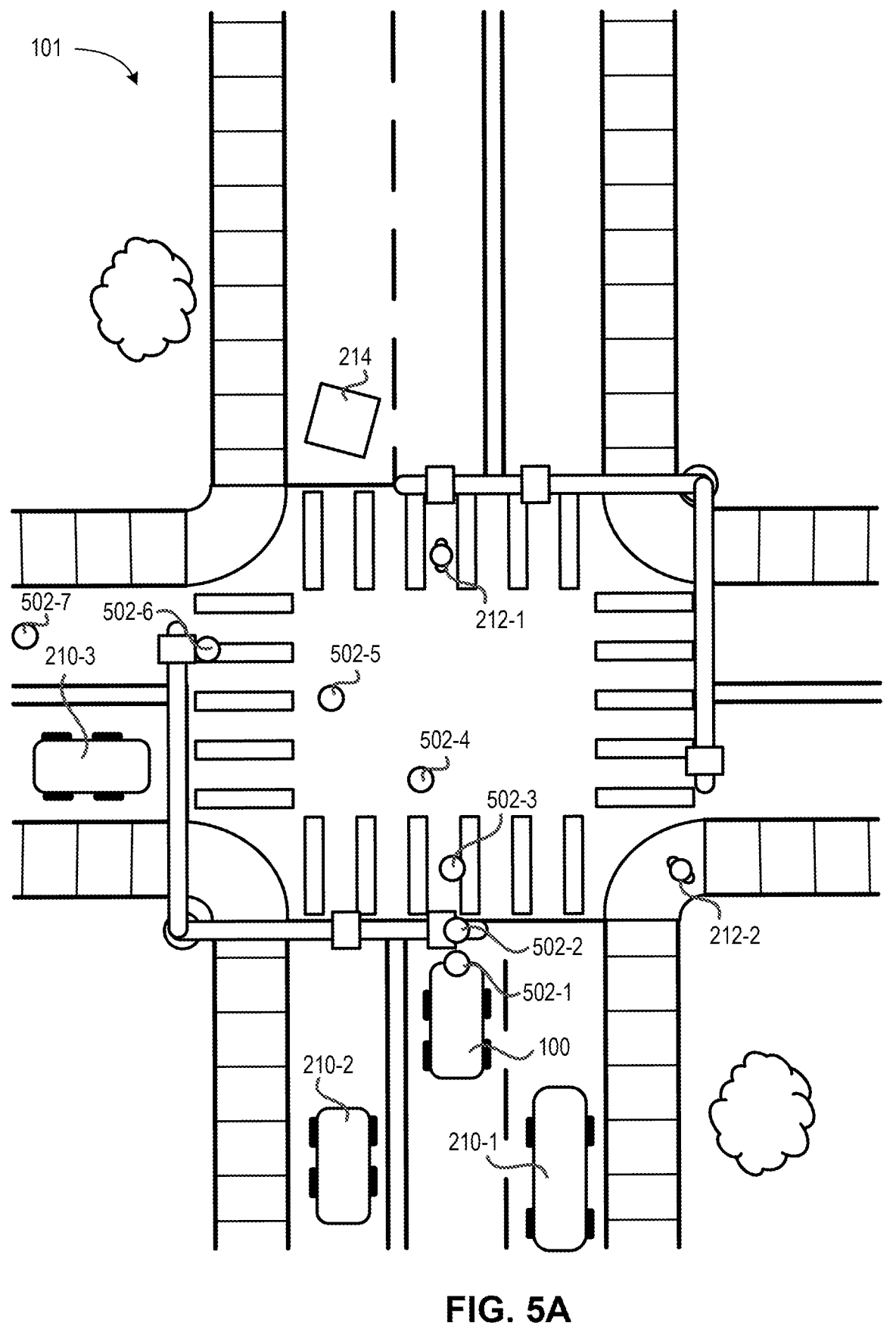

In some implementations, the predicted future trajectory 402 of the AV 100 may include multiple coordinates. Each coordinate of the multiple coordinates may include a predicted future location of the AV 100. Each coordinate may include a time indicating a future time at which the AV 100 is predicted to be located at the respective coordinate. In one or more implementations, a predetermined amount of time may separate consecutive coordinates. For example, FIG. 5A depicts the driving environment 101 of FIG. 2A after some time has passed. FIG. 5A depicts the multiple coordinates 502-1, . . . , 502-7 that form a predicted future trajectory 402 that show the predicted future locations of the AV 100 in the driving environment 101. The coordinates 502-1, . . . , 502-7 may include one or more numeric values that indicate the predicted future position of the AV 100. The coordinates 502-1, . . . , 502-7 may use any suitable numbering system or geometric configuration.

One or more of the coordinates 502-1, . . . , 502-7 may include or be associated with a future time at which the AV 100 is predicted to be located at the predicted future location indicated by the coordinate 502. A predetermined amount of time may separate consecutive coordinates 502-1, . . . , 502-7. In some cases, the predetermined amount of time may be the same amount of time between each coordinate 502. In other implementations, the predetermined amount of time may vary. In certain implementations, the predetermined amount of time may match the periodic interval at which the sensing system 110 senses the driving environment 101, or the predetermined amount of time may be different.

As an example, the predetermined amount of time may be the same for consecutive coordinates 502, and the predetermined amount of time may be 500 ms. Thus, the first coordinate 502-1 may indicate the predicted future location of the AV 100 in 500 ms, the second coordinate 502-2 may indicate the predicted future location of the AV 100 in 1 second, the third coordinate 502-3 may indicate the predicted future location of the AV in 1.5 seconds, and so on.

Figure 5B:
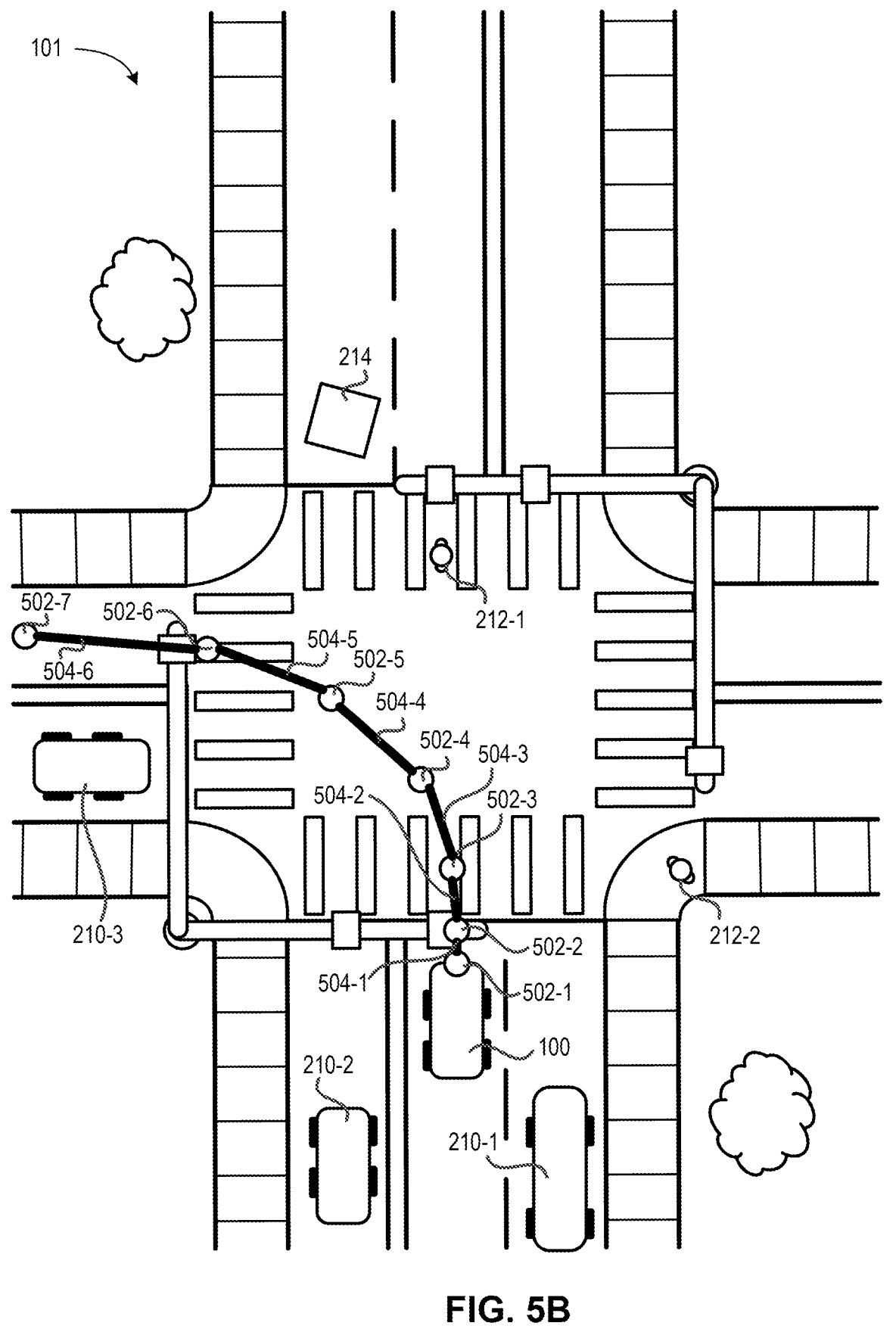

In some embodiments, the AV trajectory system 126, the AV trajectory MLM 128, or some other components of the data processing system 120 may connect the coordinates 502-1, . . . , 502-7 using one or more lines. The one or more lines may, together, form a polyline. The polyline may assist the data processing system 120, AVCS 140, or some other component of the AV 100 in determining whether the AV's 100 predicted path crosses the predicted location, path, or trajectory of an object in the driving environment 101. FIG. 5B depicts the example driving environment 101 of FIG. 5A with the coordinates 502-1, . . . , 502-7 connected by lines 504-1, . . . , 504-6 to form a polyline.

In one or more implementations, the method 300 may further include generating, using the AV trajectory MLM 128, a predicted future trajectory of an object in the environment 101 around the AV 100. The predicted future trajectory of the object may include a predicted future trajectory or a coordinate that indicates a predicted future location of the object. Such objects may include a vehicle 210, a pedestrian 212, or other objects. In some cases, a trajectory or coordinate that includes a predicted future location of an object may include or be associated with data indicating an orientation of the object.

The predicted future trajectory or coordinates associated with an object may include or be associated with future times at which the object is predicted to be at the future locations indicated by the predicted future trajectory or coordinates. In some cases, the future times associated with the predicted future trajectory or coordinates for an object may match the future times associated with a predicted future trajectory 402 or coordinates for the AV 100. For example, a first coordinate 502-1 for the AV 100 may indicate a predicted future location of the AV 100 in 500 ms, and the first coordinate for an object may indicate a predicted future location of the object in 500 ms. A second coordinate 502-2 for the AV 100 may indicate a predicted future location of the AV 100 in 1 second, and the second coordinate for the object may indicate a predicted future location of the object in 1 second, and so on. In some implementations, the data processing system 120, AV trajectory system 126, the AV trajectory MLM 128, or some other component of the AV 100 may connect the coordinates for an object to create a polyline. Responsive to the polyline of the AV 100 and the polyline of an object crossing and times associated with nearby coordinates 502 of the AV 100 and the object being within a threshold time difference, the AVCS 140 or some other component of the AV 100 may adjust the operation of the AV 100 in order to avoid a possible collision with the object.

At block 330, the method 300 includes causing, using the one or more predicted future trajectories 402-1, . . . , 402-$n$, a planning system of the AV 100 to generate an update to the current trajectory of the AV 100. The planning system may include the AVCS 140. The AVCS 140 may receive the predicted future trajectories 402-1, . . . , 402-$n$ from the data processing system 120. The AVCS 140 may receive the polyline. The AVCS 140 may update the current trajectory of the AV 100 based on the one or more predicted future trajectories 402 or the polyline.

In one implementation, adjusting the current trajectory of the AV 100 may include adjusting the direction of travel of the AV 100 and the velocity of the AV 100 in order to arrive at the next coordinate 502 in the set of multiple coordinates 402 at the future time associated with that coordinate 502. For example, as depicted in FIG. 5A, the AV 100 may determine a distance from its current location to the location indicated by the first coordinate 502-1 and may determine the interval between the current time and the predict future time associated with the first coordinate 502-1. The AVCS 140 may use these data to determine how to adjust the current trajectory of the AV 100 to arrive at the location at the predicted time.

The AVCS 140 may autonomously modify the operations of the AV 100 based on the updated trajectory. For example, the AVCS 140 may cause the powertrain 150 to operate faster in order to cause the AV 100 to reach a velocity at which it will reach the location indicated by the coordinate 502 at the associated future predicted time. The AVCS 140 may cause the steering 150 to adjust the wheels to move the AV 100 toward the location indicated by the coordinate 502. The AVCS 140 may engage the signaling 170, for example, in response to the updated trajectory indicating a turn.

Figure 6:
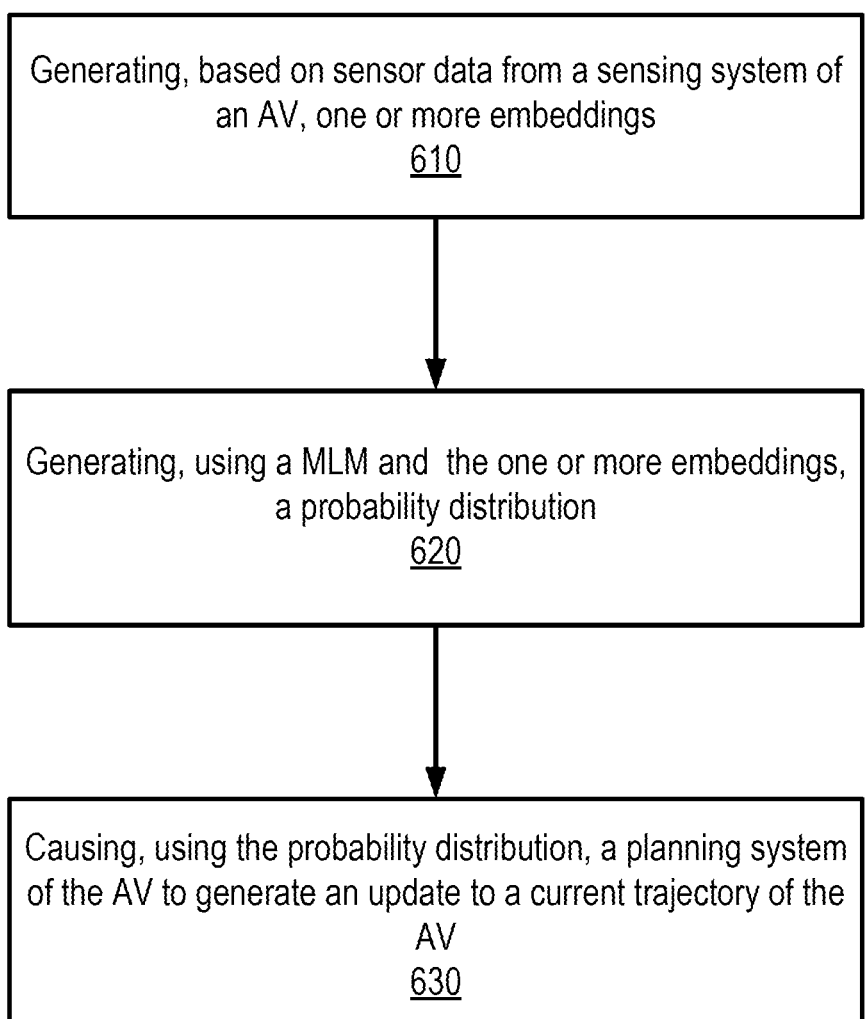
FIG. 6 depicts a flowchart diagram of an example method for trajectory prediction from multi-sensor fusion, in accordance with some implementations of the present disclosure.

FIG. 6 is a flowchart illustrating one embodiment of a method 600 for trajectory prediction from multi-sensor fusion, in accordance with some implementations of the present disclosure. A processing device, having one or more CPUs, one or more GPUs, and/or memory devices communicatively coupled to the CPU(s) and/or GPU(s) can perform the method 600 and/or each of their individual functions, routines, subroutines, or operations. The method 600 can be directed to systems and components of a vehicle. In some implementations, the vehicle can be an autonomous vehicle (AV), such as AV 100 of FIG. 1. In some implementations, the vehicle can be a driver-operated vehicle equipped with driver assistance systems, e.g., Level 2 or Level 3 driver assistance systems, that provide limited assistance with specific vehicle systems (e.g., steering, braking, acceleration, etc. systems) or under limited driving conditions (e.g., highway driving). The method 600 can be used to improve performance of the AVCS 140. In certain implementations, a single processing thread can perform method 600. Alternatively, two or more processing threads can perform method 600, each thread executing one or more individual functions, routines, subroutines, or operations of the methods. In an illustrative example, the processing threads implementing method 600 can be synchronized (e.g., using semaphores, critical sections, and/or other thread synchronization mechanisms). Alternatively, the processing threads implementing method 600 can be executed asynchronously with respect to each other. Various operations of method 600 can be performed in a different (e.g., reversed) order compared with the order shown in FIG. 6. Some operations of method 600 can be performed concurrently with other operations. Some operations can be optional.

At block 610, the method 600 includes generating one or more embeddings 200-1, . . . , 200-n based on sensor data from the sensing system 110 of the AV 100. Block 610 may include similar functionality to block 310 of the method 300 of FIG. 3.

At block 620, the method 600 includes generating, using an MLM and the one or more embeddings 200-1, . . . , 200-n, a probability distribution. The MLM may include the AV trajectory MLM 128. The probability distribution can include a probability distribution over multiple predicted future trajectories 402 of the AV 100. The probability distribution can include multiple predicted future trajectories 402. Each predicted future trajectory 402 can include multiple coordinates 502 that include predicted future locations of the AV 100. The probability distribution can include, for each predicted future trajectory 402, a probability. Thus, the probability distribution can indicate multiple possible trajectories (as indicated by the predicted future trajectories 402) that the AV 100 can travel and, for each trajectory, the probability the AV 100 will travel that trajectory.

In some implementations, the AV trajectory MLM 128 may generate a probability distribution over multiple predicted future trajectories 402. This may provide flexibility for the AV 100 in selecting a path through the driving environment 101 based on, for example, changing conditions in the driving environment 101. In one implementation, the probability distribution may include at least three coordinate sets 502. This may provide at least three possible paths for the AV 100.

The AV trajectory MLM 128 may be configured to output the probability distribution. The AV trajectory MLM 128 may undergo a training process using a dataset of records, as discussed above. For example, a dataset record may include one or more example embeddings 200 or may include sensor data, a location history of an AV, or one or more location histories of one or more objects, as discussed above. The ground truth of a dataset record may include a probability distribution over multiple predicted future trajectories 402 that indicate possible predicted future locations of the AV 100. The training process may include similar functionality to the training process discussed above in relation to the method 300.

As discussed above, in some embodiments, the AV trajectory MLM 128 may accept one or more embeddings 200-1, . . . , 200-n as input. This may include inputting all of the one or more embeddings 200-1, . . . , 200-n into the AV trajectory MLM 128 as a single piece of input, and the AV trajectory MLM 128 may generate the probability distribution as the output. The one or more embeddings 200-1, . . . , 200-n may include a rolling set of embeddings 200-1, . . . , 200-n of a predetermined size. Inputting the one or more embeddings 200-1, . . . , 200-n may include inputting the different embeddings 200-1, . . . , 200-n one at a time, and the AV trajectory MLM 128 may generate a probability distribution for each embedding 200 that was input. In some implementations, the AV trajectory MLM 128 may include a MLM configured to use internal state to process sequences of inputs.

In some embodiments, the method 600 may further include the AV trajectory MLM 128 generating a probability distribution for a predicted future trajectory of an object in the driving environment 101. The probability distribution for the object's predicted future trajectory may include multiple coordinate sets. Each coordinate set can include multiple coordinates that include predicted future locations of the object. The probability distribution for the object's predicted future trajectory can include, for each predicted future trajectory, a probability that the object will follow the respective predicted future trajectory. Thus, the probability distribution can indicate multiple possible paths (as indicated by the predicted future trajectories) that the object can take and, for each path, the probability the object will take that path.

At block 630, the method 600 includes causing, using the probability distribution, a planning system of the AV 100 to generate an update to the current trajectory of the AV 100. Block 630 may include similar functionality to block 330 of the method 300. The planning system may include the AVCS 140. The AVCS 140 may use the probability distribution to autonomously modify operations of the AV 100 based on the update to the trajectory of the AV 100.

In some implementations, the AVCS 140 may select, from the multiple predicted future trajectories of the probability distribution, the predicted future trajectory 402 with the highest associated probability. The AVCS 140 may then modify the operations of the AV 100 to follow the trajectory indicated by the selected predicted future trajectory 402. Modifying the operations of the AV 100 may include similar operations to those discussed above in relation to block 330 of the method 300. In some embodiments, the AVCS 140 may also receive one or more probability distributions over predicted future trajectories for one or more objects in the driving environment 101. The AVCS 140 may update the current trajectory of the AV 100 further based on these probability distributions for the one or more objects.

Figure 7:
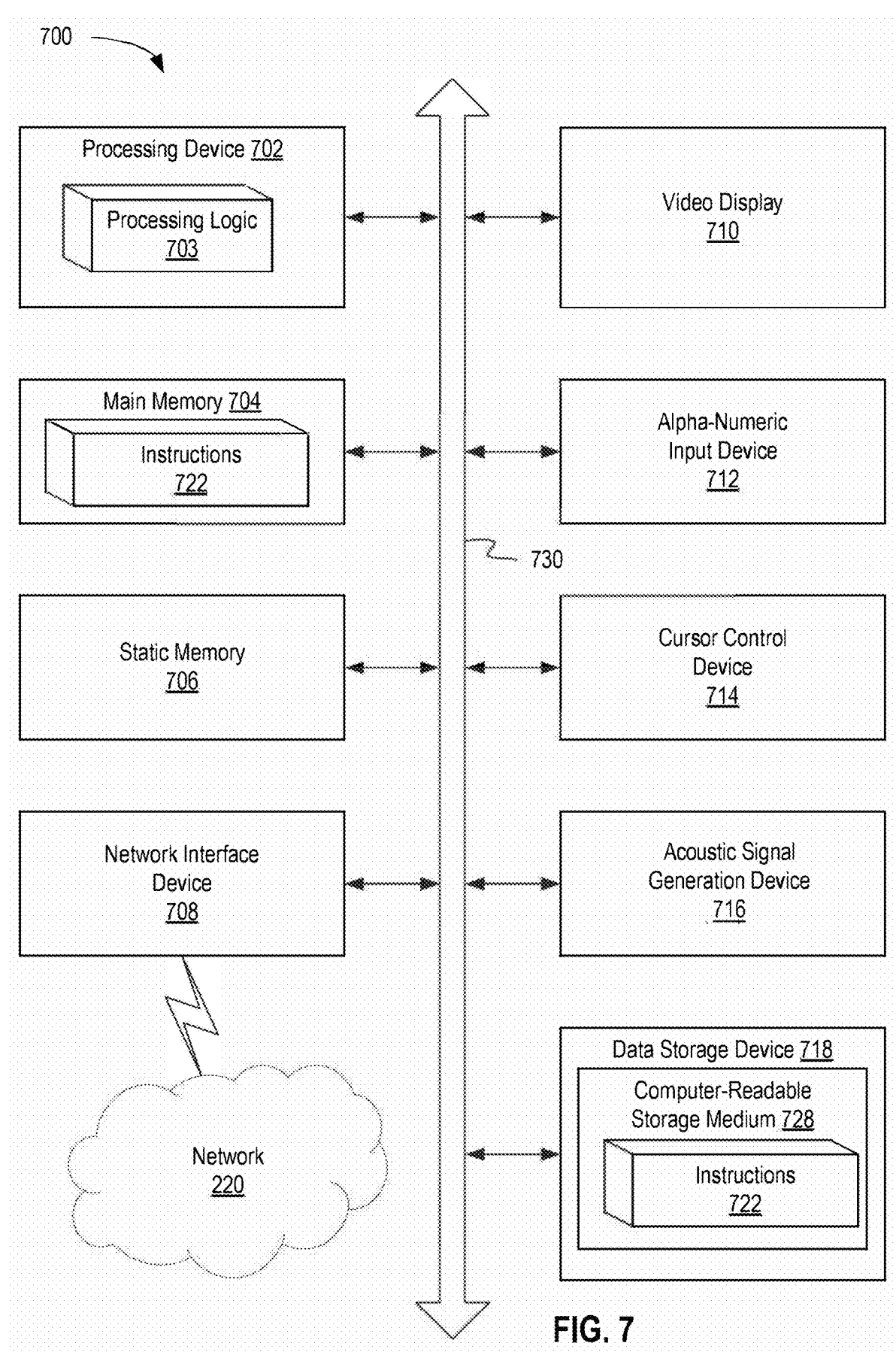
FIG. 7 depicts a block diagram of an example computer device capable of trajectory prediction from multi-sensor fusion, in accordance with some implementations of the present disclosure.

FIG. 7 depicts a block diagram of an example computer device 700 capable of trajectory prediction from multi-sensor fusion, in accordance with some implementations of the present disclosure. Example computer device 700 can be connected to other computer devices in a local area network (LAN), an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 (which can include processing logic 703) represents one or more general-purpose processing devices such as a microprocessor, CPU, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as a GPU, an application specific integrated circuit (ASIC), a field programmable gate array (FPGA), a digital signal processor (DSP), network processor, or the like. In accordance with one or more aspects of the present disclosure, processing device 702 can be configured to execute instructions performing methods 300 or 600 for trajectory prediction from multi-sensor fusion.

Example computer device 700 can further comprise a network interface device 708, which can be communicatively coupled to a network 220. A network interface device 708 may include a network card, a network interface controller, or some other network interface. The network 220 may include a LAN, an intranet, an extranet, the Internet, a modem, a router, a switch, or some other network or network device. In some embodiments, the computer device 700 may be in data communication with other systems or device over the network 220. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions performing the methods 300 or 600.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

In some cases, certain components of the AV 100 (e.g., the sensing system 110, the data processing system 120, the AVCS 140, or other components) may include a computer device 700.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general-purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
generating, based on sensor data from a sensing system of an autonomous vehicle (AV), one or more embeddings characterizing an environment around the AV;
generating, using a machine learning model (MLM) and the one or more embeddings as input to the MLM, one or more outputs of the MLM, the one or more outputs comprising a predicted future trajectory of the AV, and determined driving environment conditions of the AV, wherein the predicted future trajectory of the AV comprises a plurality of coordinates indicating predicted future locations of the AV at respective future times; and
causing, using the predicted future trajectory, a planning system of the AV to generate an update to a current trajectory of the AV.

2. The method of claim 1, wherein:
the sensor data comprises data from a plurality of sensor devices of the sensing system of the AV; and

generating, based on the sensor data from the sensing system of the AV, the one or more embeddings comprises combining the data from the plurality of sensor devices into an embedding from the one or more embeddings.

3. The method of claim 2, wherein the plurality of sensor devices of the sensing system comprises at least one of:
a camera;
a radar unit; or
a lidar unit.

4. The method of claim 1, wherein the one or more embeddings comprise:
a first embedding that characterizes the environment around the AV at a first time; and
a second embedding that characterizes the environment around the AV at a second time.

5. The method of claim 4, wherein:
the first time comprises a current time; and
the second time comprises a time before the first time.

6. The method of claim 1, further comprising generating, using the MLM and the one or more embeddings, a predicted future trajectory of an object in the environment around the AV.

7. The method of claim 1, wherein:
each of the plurality of coordinates includes a time indicating a future time at which the AV is predicted to be located at a respective coordinate; and
a predetermined amount of time separates consecutive coordinates of the plurality of coordinates.

8. The method of claim 7:
further comprising connecting the plurality of coordinates using one or more lines to form a polyline; and
wherein causing the planning system to generate the update to the current trajectory of the AV comprises providing the polyline to the planning system.

9. A system, comprising:
a memory; and
one or more processing devices, coupled to the memory, configured to perform operations comprising:
generating one or more embeddings based on sensor data from a sensing system of an autonomous vehicle (AV), wherein each embedding of the one or more embeddings characterizes an environment around the AV;
generating, using a machine learning model (MLM) and the one or more embeddings as input to the MLM, one or more outputs of the MLM, the one or more outputs comprising a plurality of predicted future trajectories of the AV, and determined driving environment conditions of the AV, wherein a predicted future trajectory of the plurality of predicted future trajectories of the AV comprises a plurality of coordinates indicating predicted future locations of the AV at respective future times; and
causing, using the plurality of predicted future trajectories, a planning system of the AV to generate an update to a current trajectory of the AV.

10. The system of claim 9, wherein the one or more embeddings comprises at least ten embeddings.

11. The system of claim 9, wherein:
the one or more embeddings comprise a predetermined number of embeddings; and
in response to adding a new embedding to the one or more embeddings, removing an oldest embedding from the one or more embeddings.

12. The system of claim 9, wherein:
an embedding from the one or more embeddings comprises an array of numerical values; and a first portion of the array of numerical values comprises a numerical value characterizing a drivable surface.

13. The system of claim 12, wherein a second portion of the array of numerical values comprises a numerical value characterizing an orientation of a head of a pedestrian.

14. The system of claim 12, wherein a third portion of the array of numerical values comprises a numerical value characterizing an orientation of a head of a driver of a vehicle.

15. The system of claim 12, wherein a fourth portion of the array of numerical values comprises a numerical value characterizing a state of a traffic light.

16. The system of claim 9, wherein the operations further comprise generating, using the MLM and the one or more embeddings:

a plurality of predicted future trajectories of an object in the environment around the AV; and an orientation of the object at one or more locations along the predicted future trajectories of the object.

17. A system, comprising:

a memory; and one or more processing devices, coupled to the memory, configured to perform operations comprising:

generating, based on sensor data from a sensing system of an autonomous vehicle (AV), one or more embeddings characterizing an environment around the AV;

generating, using a machine learning model (MLM) and the one or more embeddings as input to the MLM, one or more outputs of the MLM, the one or more outputs comprising a first probability distribution, and determined driving environment conditions of the AV, wherein the first probability distribution comprises:

a plurality of predicted future trajectories of the AV, wherein a predicted future trajectory of the plurality of predicted future trajectories of the AV comprises a plurality of coordinates indicating predicted future locations of the AV at respective future times, and for each predicted future trajectory of the plurality of predicted future trajectories of the AV, a probability; and causing, using the first probability distribution, a planning system of the AV to generate an update to a current trajectory of the AV.

18. The system of claim 17, wherein the plurality of predicted future trajectories of the AV comprises at least three predicted future trajectories.

19. The system of claim 17, wherein the operations further comprise generating, by the MLM and based on the one or more embeddings, a second probability distribution for a predicted future trajectory of an object in the environment around the AV.

20. The system of claim 17, wherein:

the operations further comprise training the MLM using a dataset that comprises a plurality of records associated with historical data previously recorded for a second AV; and each record of the dataset comprises:

sensor data from a sensing system of the second AV in an environment around the second AV, a location history of the second AV in the environment around the second AV, a location history of an object in the environment around the second AV, and a ground truth comprising a trajectory of the second AV in the environment around the second AV.

* * * * *